United States Patent [19]

Kashihara et al.

[11] Patent Number: 4,882,952
[45] Date of Patent: Nov. 28, 1989

[54] HYDRAULIC CONTROL SYSTEM FOR AUTOMATIC TRANSMISSION WITH SHIFTING SHOCK REDUCING MEANS

[75] Inventors: Yuji Kashihara, Toyota; Yutaka Taga, Aichi; Seitoku Kubo, Toyota, all of Japan

[73] Assignee: Toyota Jidosha Kabushiki Kaisha, Japan

[21] Appl. No.: 154,380

[22] Filed: Feb. 10, 1988

[30] Foreign Application Priority Data

Feb. 19, 1987 [JP] Japan .................................. 62-36629

[51] Int. Cl.$^4$ ............................................. B60K 41/06
[52] U.S. Cl. ........................................ 74/867; 74/866
[58] Field of Search ................... 74/866, 867, 868, 869

[56] References Cited

U.S. PATENT DOCUMENTS

| | | | |
|---|---|---|---|
| 3,956,947 | 5/1976 | Leising et al. ......................... | 74/866 |
| 4,570,511 | 2/1986 | Nishimura et al. .................... | 74/867 |
| 4,633,739 | 1/1987 | Ogasawara et al. ................... | 74/869 |
| 4,674,364 | 6/1987 | Shindo et al. ...................... | 74/869 X |
| 4,713,989 | 12/1987 | Hayakawa et al. ................... | 74/869 |
| 4,722,247 | 2/1988 | Shindo et al. ......................... | 74/867 |
| 4,727,774 | 3/1988 | Sumiya et al. ......................... | 74/867 |
| 4,730,521 | 3/1988 | Hayasaki et al. ..................... | 74/867 |
| 4,745,826 | 5/1988 | Nishikawa et al. ................ | 74/867 X |
| 4,751,858 | 6/1988 | Iwatsuki .............................. | 74/867 |

FOREIGN PATENT DOCUMENTS 56-138533 10/1981 Japan .
61-149657 7/1986 Japan .

*Primary Examiner*—Dwight G. Diehl
*Attorney, Agent, or Firm*—Oliff & Berridge

[57] ABSTRACT

A hydraulic control system for an automatic transmission has a shifting shock reducing device capable of regulating the transitional oil pressure applied to the frictionally engaging devices of the automatic transmission, and provided between a shift valve and the frictionally engaging devices. The shifting shock reducing device is controlled on the basis of a signal representative of the torque of the engine, and a signal representative of the transitional shift state to regulate the transitional oil pressure. Thus, the hydraulic control system is highly reliable, is capable of compensating for variations of the functions thereof over time, and is capable of maintaining a high control accuracy.

14 Claims, 7 Drawing Sheets

| SHIFT RANGE | GEAR | SOLENOID S1 | SOLENOID S2 | C0 | C1 | C2 | B0 | B1 | B2 | B3 |
|---|---|---|---|---|---|---|---|---|---|---|
| P | PARK | × | × | ○ | | | | | | |
| R | REV | × | × | ○ | | | | | | ○ |
| N | NEU | × | × | ○ | | | | | | |
| Ⓓ | 1st | ○ | × | ○ | ○ | | | | | |
| Ⓓ | 2nd | ○ | ○ | ○ | ○ | | | | ○ | |
| Ⓓ | 3rd | × | ○ | ○ | ○ | ○ | | | ○ | |
| Ⓓ | OD | × | × | | ○ | ○ | ○ | | ○ | |
| Ⓢ | 1st | ○ | × | ○ | ○ | | | | | |
| Ⓢ | 2nd | ○ | ○ | ○ | ○ | | | ○ | ○ | |
| Ⓢ | (3rd) | × | ○ | ○ | ○ | ○ | | | ○ | |
| L | 1st | ○ | × | ○ | ○ | | | | | ○ |
| L | (2nd) | ○ | ○ | ○ | ○ | | | ○ | ○ | |

HYDRAULIC CONTROL SYSTEM FOR AUTOMATIC TRANSMISSION WITH SHIFTING SHOCK REDUCING MEANS

BACKGROUND OF THE INVENTION

The present invention relates to a hydraulic control system for an automatic transmission, capable of reducing shocks in shifting the automatic transmission.

A hydraulically controlled automatic transmission is shifted by applying oil pressure to a frictionally engaging device to which oil pressure has not been applied or by releasing oil pressure from a frictionally engaging device to which oil pressure has been applied. Accordingly, the transitional characteristics of oil pressure in controlling frictionally engaging devices for shifting the automatic transmission, particularly those in which oil pressure is applied to the frictionally engaging devices, are very important for reducing shocks in shifting the automatic transmission.

Conventional hydraulic control systems for automatic transmissions have an accumulator in the form of a hydraulic cylinder including a piston for regulating the transitional characteristics of oil pressure to be applied to the frictionally engaging device. The accumulator is provided between a shift valve for changing the oil supply passage to change the gear stage of the automatic transmission, and the frictionally engaging device. This accumulator maintains the supply oil pressure to be applied to the frictionally engaging device substantially at a set oil pressure for the period of time during which the piston slides within the cylinder to reduce shocks attributable to the variation of the input system in rotating speed in shifting the automatic transmission.

The optimum value of the set oil pressure is dependent on the torque of the engine transmitted to the automatic transmission. The set oil pressure can be controlled by regulating the oil pressure in the backpressure chamber of the accumulator.

Japanese Patent Laid-Open (Kokai) No. 56-138533 discloses a hydraulic control system in which oil pressure which is varied according to the throttle opening (the degree of opening of the throttle valve of the engine: which represents engine torque), such as the line pressure or the throttle modulator pressure, is applied to the backpressure chamber of such an accumulator to regulate the transitional oil pressure applied to the frictionally engaging device according to the torque of the engine by the accumulator.

Japanese Patent Laid-Open (Kokai) No. 61-149657 discloses a hydraulic control system for an automatic transmission, in which the oil pressure applied to the backpressure chamber of an accumulator is adjusted to a further optimum value on the basis of factors such as oil temperature in the automatic transmission, the temperature of the intake air, the type of shifting, the running speed of the vehicle, the engine speed and the supercharging pressure, in addition to the torque of the engine (the throttle opening), to regulate the oil pressure applied to the frictionally engaging device for optimum transitional characteristics. The hydraulic control system disclosed in Japanese Patent Laid-Open (Kokai) No. 61-149657 controls the transitional oil pressure acting on the frictionally engaging device on the basis of the present running condition of the vehicle or various parameters including those representive of the ambient conditions of the vehicle, and hence the hydraulic control system is able to control the transitional characteristics of the oil pressure acting on the frictionally engaging device more minutely.

However, the following problems arise in this hydraulic control system when mounted on a vehicle for practical control operation.

The first problem is due to inaccuracies in oil pressure generating devices. Generally, in controlling the oil pressure acting on the backpressure chamber of the accumulator on the basis of many parameters, basic detection signals provided by detectors are processed by a computer. The computer adjusts the oil pressure to a target oil pressure, for example, through the duty control of a solenoid valve. However, even if the computer provides an appropriate and accurate control signal, the oil pressure will not be appropriately regulated because of the operating inaccuracy of the solenoid valve.

The second problem is the reliability of the fail-safe arrangement. Regulating means operated by an electrical control signal function normally when the detection signals provided by the detectors are processed normally. However, it is possible that an abnormal or faulty signal (representing a condition entirely different from an actual condition) may be applied to the computer when a fault occurs in the electric circuit. Furthermore, when a disconnection or short circuit occurs in a transmission line for transmitting a signal, produced through processing the detection signals provided by the detectors, for controlling the solenoid valve, the signal for regulating the transitional characteristics of the oil pressure applied to the frictionally engaging devices is invalidated, thereby incorrectly enhancing the shocks during shifting of the automatic transmission or, worse yet, preventing shifting of the automatic transmission.

The third problem is caused by a number of varying factors. Although many parameters representing of the running condition of the vehicle and the ambient conditions of the vehicle are employed for controlling the transitional characteristics of the oil pressure, the hydraulic control system inevitably includes causes of indefinite variation which cannot be expected at the stage of design and the causes can develop significantly. For example, the line pressure, namely, the basic pressure, of a hydraulic control system is regulated, in general, on the basis of data obtained through a throttle cable interlocked with the throttle valve of the engine, and a throttle cam. In such an arrangement, the adjustment of the throttle cable is different between vehicles and such difference cannot be taken into consideration in producing a control program to be executed by the computer. Moreover, it is impossible to design the hydraulic control system so as to be able to accomodate variations in the mode of flow of oil in the oil passage due to the accumulation of impurities in the oil. Naturally, these inherent variations which occur in the manufacturing process or develop with time, cause the faulty regulation of the transitional characteristics of the oil pressure applied to the frictionally engaging device, thereby deteriorating the shift characteristics of the automatic transmission.

SUMMARY OF THE INVENTION

Accordingly, it is an object of the present invention to provide a hydraulic control system for an automatic transmission, (1) capable of being manufactured at low cost and being tuned at a high accuracy without requiring component devices, such as solenoid valves, capable of very high performance, (2) capable of securing the tolerable shift characteristics of the automatic transmission by suppressing the deviation of the transitional characteristics of the oil pressure from a set value even if failure occurs in the electric system, and (3) capable of properly dealing with the inherent differences among otherwise identical vehicles, which differences are created during the manufacturing process or vary with time and vehicle use, to enable the automatic transmission to always operate with optimum shift characteristics.

Figure 1:
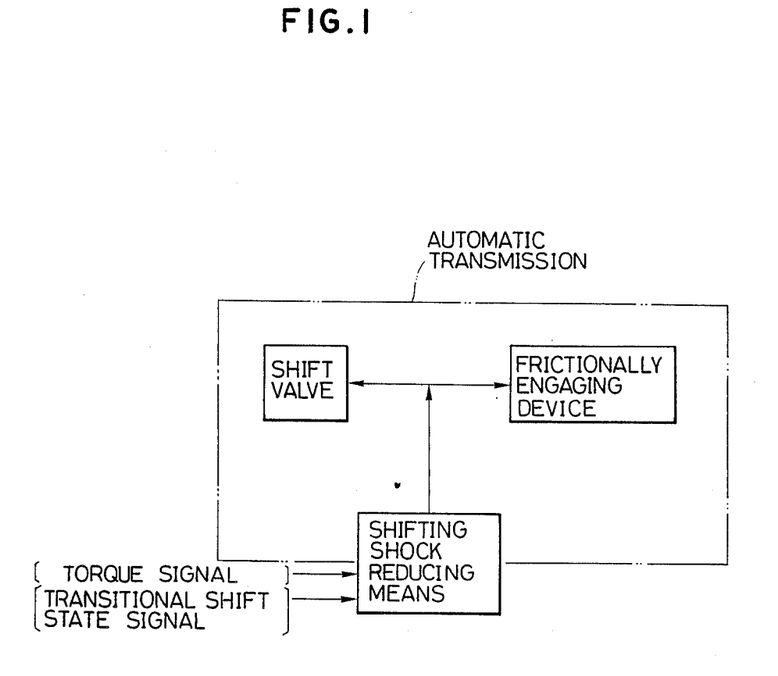
FIG. 1 is a block diagram of the present invention.

To achieve the object of the invention, the present invention provides a hydraulic control system comprising, as shown in FIG. 1, shifting shock reducing means provided between a shift valve for changing the oil supply passage for changing the gear stage of an automatic transmission and a frictionally engaging device, and capable of regulating the transitional oil pressure applied to the frictionally engaging device to engage the same; torque signal generating means for generating a torque signal representative of the torque of the engine; transitional shift state signal generating means for generating a signal representative of a transitional shift state; and control means for controlling the transitional oil pressure regulated by the shift shock reducing means at least on the basis of the torque signal and the transitional shift state signal.

The hydraulic control system according to the present invention has a shift shock reducing means provided between the shift valve and the frictionally engaging device, and capable of regulating the transitional oil pressure applied to the frictionally engaging device. The hydraulic control system according to the present invention also has the torque signal generating means for generating a torque signal representative of the torque of the engine, and the transitional shift state signal generating means for generating a signal representative of the transitional state of shifting. The transitional oil pressure regulated by the shift shock reducing means is controlled on the basis of at least the torque signal and the transitional shift state signal.

Thus, the shift shock reducing means is controlled on the basis of the control elements of at least two systems. Accordingly, the transitional oil pressure applied to the frictionally engaging device will not deviate significantly from a set value even if one of the systems malfunctions for any reason by any chance, because the shift shock reducing means is controlled by the control signal provided by the other system. Particularly, as in the embodiment mentioned later, the employment of torque signal generating means to detect the throttle opening of the engine mechanically, for example by means of the throttle cable and the throttle cam, enhances the fail-safe function of the hydraulic control system considerably as compared with a hydraulic control system employing a shift shock reducing means controlled entirely by electrical means, because the failure rate of mechanical means is far less than that of electrical means.

When the transitional oil pressure is controlled by the elements of two systems, the solenoid valve can be used only for one system (a system for fine adjustment). Accordingly, in the hydraulic control system of the present invention, the range of control operation of the solenoid valve is narrow, and hence the hydraulic control system can be manufactured at low cost and high accuracy control.

Furthermore, since the hydraulic control system of the present invention uses an oil pressure representative of the transitional shift state for the feedback control of the transitional oil pressure applied to the frictionally engaging device to engage the same, the hydraulic control system is able to absorb the inherent variations of the vehicle determined by and during manufacturing or developed over time and to control the transitional oil pressure at an optimum value for the present condition of the vehicle. It is also possible to set the oil pressure on the basis of various relatively slowly varying factors, such as oil temperature and intake air temperature, by thus generating a transitional oil pressure representative of the transitional shift state.

In a first preferred embodiment of the present invention, the shift shock reducing means is an accumulator having a backpressure chamber, and the control means for controlling the transitional oil pressure on the basis of the torque signal and the transitional shift state signal is a backpressure control valve for controlling the transitional oil pressure in the backpressure chamber of the accumulator. The accumulator is equivalent to an oil reservoir provided in an oil passage to suppress an increase of oil pressure. This first preferred embodiment is able to apply the necessary line pressure to the frictionally engaging device even if failure occurs in the hydraulic control system, so that the basic shift control operation can be carried out.

However, the shift shock reducing means of the present invention is not necessarily limited to the accumulator, but may be, for example, means for directly controlling the oil pressure prevailing in an oil passage for supplying oil pressure to the frictionally engaging device.

In the second preferred embodiment of the present invention, the torque signal is throttle pressure which is mechanically generated by the throttle pressure valve. The throttle pressure valve reflects the throttle opening of the engine through the throttle cable and the throttle cam for example. And the transitional shift state signal is solenoid pressure generated by a solenoid valve controlled by a signal detected by electrical means.

As mentioned above, in the present invention, the torque signal and the transitional shift state signal may be detected by either mechanical means or electrical means. However, the second preferred embodiment provides both high reliability and high accuracy. That is, electrical detecting means has excellent response characteristics, facilitates signal composing and signal processing procedures, and is capable of highly accurate detection. Therefore, electrical detecting means is the optimum means for detecting a signal representative of the transitional shift state which needs to be detected at a high response speed and high accuracy and needs to be processed easily. However, a hydraulic control system employing electrical detecting means is disadvantageous in that all functions thereof are invalidated when, for any reason, disconnection occurs in the wiring. On the other hand, mechanical detecting means is highly reliable against failure. Therefore, when mechanical means is employed for providing the torque signal representative of the torque of the engine, the hydraulic control sytem is always able to maintain at least the necessary control functions even if the signal system for representing the transitional shift state malfunctions.

In the third preferred embodiment of the present invention, the transitional shift state signal includes a factor representing the state of variation of engine speed or a factor representing the state of variation of the rotating speed of the input shaft of the automatic transmission. Shifting speed can be determined through the observation of the state of variation of engine speed or the state of variation of the rotating speed of the input shaft of the automatic transmission. A signal indicating the level of the shifting speed as compared with a reference shifting speed is very effective for representing the transitional shift state. Naturally, the oil pressure is reduced when the shifting speed is higher than the reference shifting speed, and is increased when the shifting speed is lower than the reference shifting speed. However, in the present invention, the signal representative of the transitional shift state may be provided by any suitable means.

BRIEF DESCRIPTION OF THE DRAWINGS

The above and other objects, features and advantages of the present invention will become more apparent from the following description of the invention taken in conjuction with the accompanying drawings, wherein like reference characters designate the same or similar parts, and wherein.

DESCRIPTION OF THE PREFERRED EMBODIMENTS

The present invention will be described in detail hereinafter with reference to the accompanying drawings illustrating the preferred embodiment of the present invention.

Figure 2:
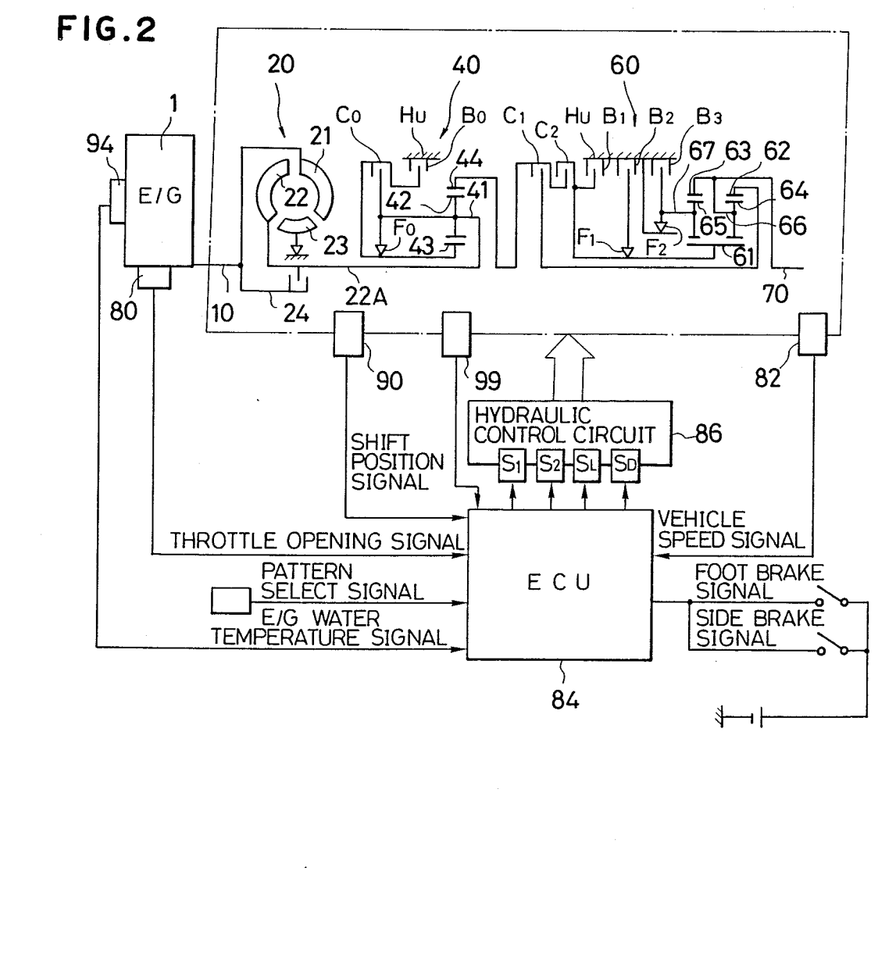
FIG. 2 is a block diagram of an automotive automatic transmission incorporating a hydraulic control system, in a preferred embodiment, according to the present invention.

Referring to FIG. 2, an automotive automatic transmission incorporating a hydraulic control system, in a preferred embodiment, according to the present invention has a transmission unit comprising a torque converter 20, an overdrive unit 40 and an underdrive unit 60 having three forward gear stages and one reverse gear stage.

The torque converter 20 is of a known type comprising a pump 21, a turbine 22, a stator 23 and a lockup clutch 24.

The overdrive unit 40 has a planetery gearing comprising a sun gear 43, a ring gear 44, a planetary pinion 42 and a carrier 41. The operating mode of the planetary gearing is controlled through the control of a clutch CO, a brake BO and a one-way clutch FO.

The underdrive unit 60 has two sets of planetary gearings comprising a common sun gear 61, ring gears 62 and 63, planetary pinions 64 and 65 and carriers 66 and 67. The respective operating modes of the two sets of planetary gearings and the connection of the same with the overdrive unit 40 are controlled through the control of clutches C1 and C2, brakes B1, B2 and B3 and one-way clutches F1 and F2. The transmission unit per se is of a known transmission and hence the construction thereof will be illustrated diagrammatically in FIG. 2 and the description thereof will be omitted.

Figure 3:
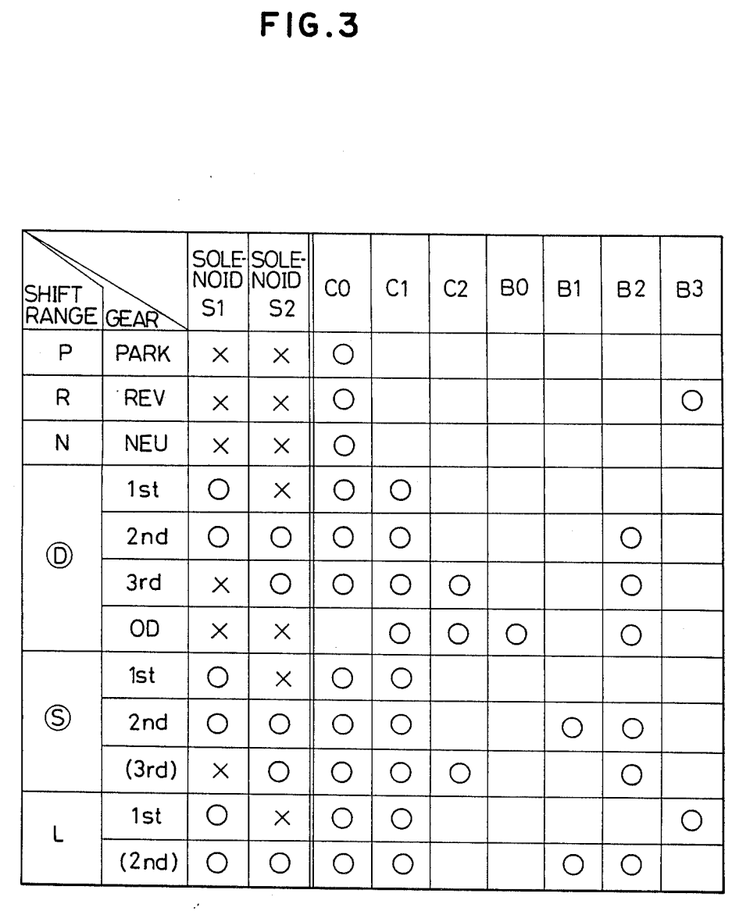
FIG. 3 is a table showing the operating modes of frictionally engaging devices of the automatic transmission of FIG. 2.

The automatic transmission comprises the foregoing transmission unit and an electronic control unit (ECU) 84. Signals provided by a throttle detector 80 for detecting the throttle opening of the engine 1, representing the output torque of an engine 1 to determine shift point, a running speed detector 82 for detecting the running speed of the vehicle through the detection of the output shaft 70 of the transmission unit, and an input shaft speed detector 99 for detecting the rotating speed of the input shaft of the automatic transmission, namely, the rotating speed of the turbine 22, to produce a signal representative of a transitional shifting state, are applied to the ECU 84. The ECU 84 controls, on the basis of the signals applied thereto by the detectors, the solenoid valves S1 and S2 for controlling a shift valve, and solenoid SL for controlling a lockup clutch 24 of the torque converter 20 according to a predetermined map defining the relation between throttle opening and running speed to select an appropriate combination of the respective operating states of the clutches and brakes among those shown in FIG. 3.

Figure 4:
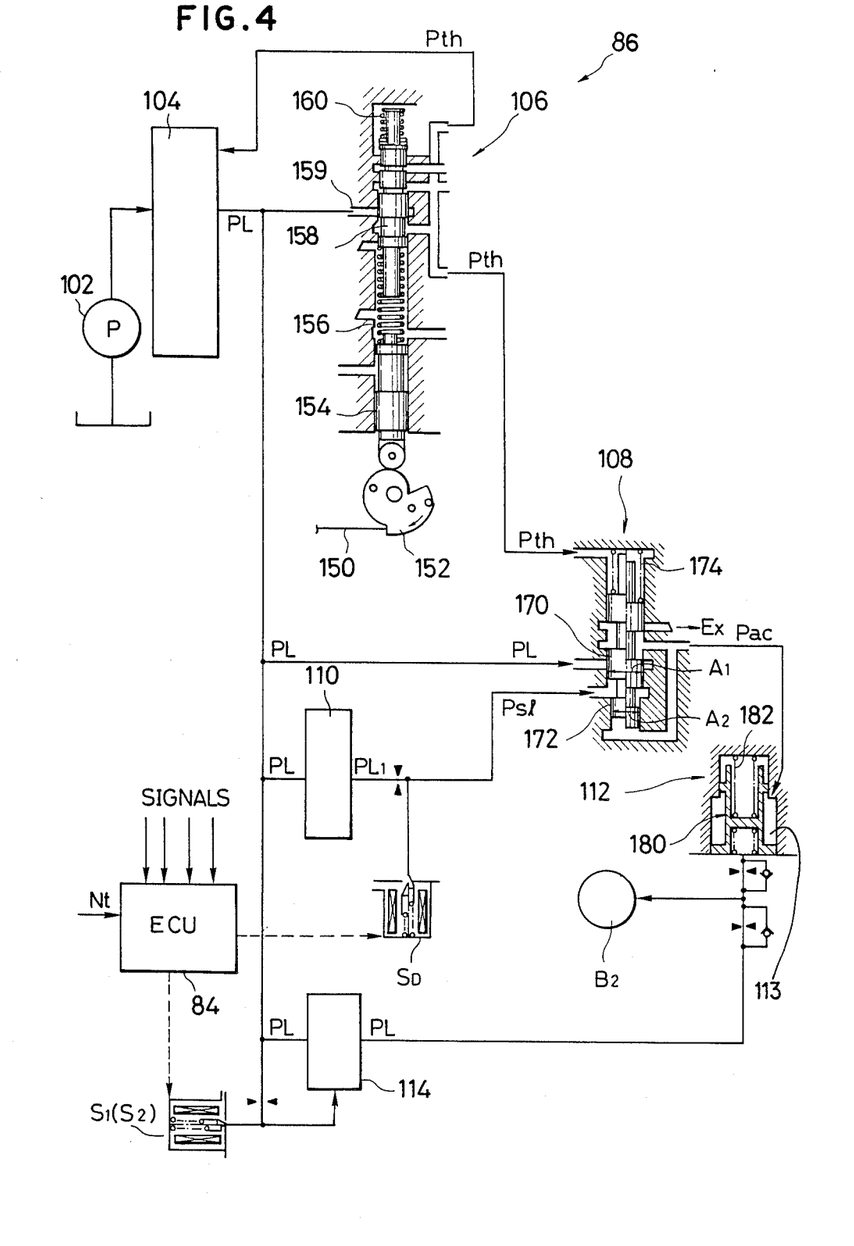
FIG. 4 is a hydraulic circuit diagram showing a portion of the hydraulic control system incorporated into the automatic transmission of FIG. 2.

Referring to FIG. 4 showing of the hydraulic control circuit 86, there are shown an oil pump 102, a primary regulating valve 104, a throttle pressure valve 106, an accumulator backpressure control valve 108, a modulator valve 110, an accumulator 112 and a shift valve 114. In FIG. 4, only the brake B2 is shown as an exemplification of the frictionally engaging devices.

Pressure generated by the oil pump 102 is regulated to a line pressure PL by a known method by the primary regulating valve 104.

Figure 5:
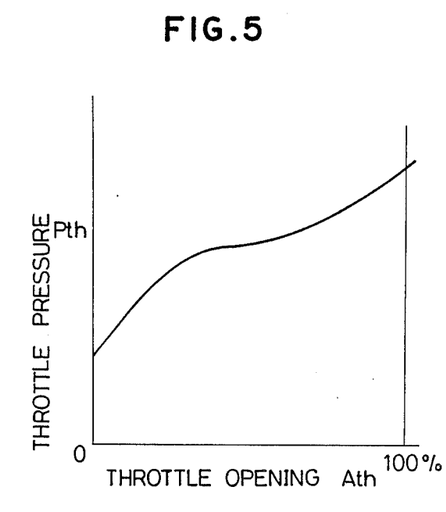
FIG. 5 is a graph showing the relation between the throttle opening of the engine and throttle pressure.

The throttle valve 106 provides a throttle pressure corresponding to the position of the accelerator pedal, namely, a pressure representative of the output torque of the engine. The throttle opening of the throttle valve (not shown) of the engine is transmitted mechanically to the throttle pressure valve 106 through a throttle cable 150 and a throttle cam 152. When the accelerator pedal is depressed, the throttle cam 152 is turned by the throttle cable 150 to push a downshift plug 154 upward, and the downshift plug 154 pushes a spool 158 upward through a spring 156. Consequently, a line pressure port 159 is opened to generate a throttle pressure Pth. The throttle pressure Pth is also delivered (fed-back) to the opposite side of the spool 158. According to the balance among the resilient force of the spring 156, the resilient force of a spring 160, and the pressure force of the throttle pressure Pth, the line pressure port 159 is closed. Thus, the throttle pressure Pth represents the throttle opening of the engine 1. FIG. 5 shows the relation of the throttle pressure Pth and throttle opening Ath. In this embodiment, the throttle pressure Pth corresponds to the torque signal representative of the output torque of the engine. The throttle pressure Pth is applied also to the primary regulating valve 104, and hence the line pressure PL regulated by the primary regulating valve 104 represents the output torque of the engine.

Figure 6:
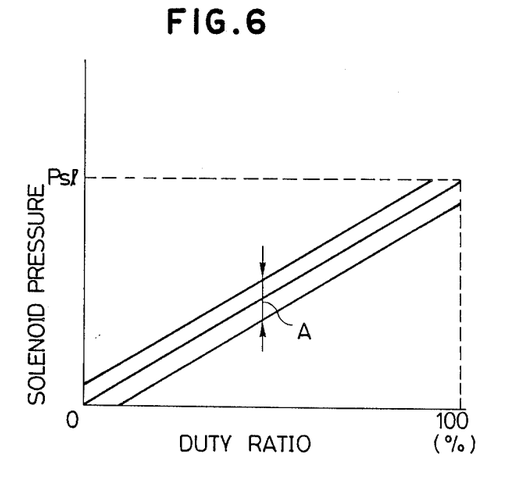
FIG. 6 is a graph showing the relation between duty ratio and solenoid pressure.

A signal representative of the transitional state of shifting is generated by the following procedure. As mentioned above, a signal representative of the rotating speed Nt of the input shaft of the automatic transmission, namely, the rotating speed of the turbine 22, is applied to the ECU 84. The rotating speed Nt is compared with a predetermined reference rotating speed NtO. For example, when the automatic transmission is upshifted, the rotating speed Nt of the input shaft is reduced. When the rotating speed Nt is reduced faster than the reference rotating speed NtO, the progress of the upshifting operation is excessively fast. In such a case, a transitional shift state signal is generated so as to reduce the transitional pressure applied to the frictionally engaging devices. Specifically, the duty ratio of a solenoid valve SD is controlled by the ECU 84 to generate the transitional shift state signal. That is, the transitional shift state signal is generated by regulating a solenoid pressure PL1, which is generated by modulating the line pressure PL by the modulator valve 110, to a solenoid pressure Psl corresponding to the duty ratio. FIG. 6 shows the relation between duty ratio and solenoid pressure Psl (transitional shift state signal).

Figure 7:
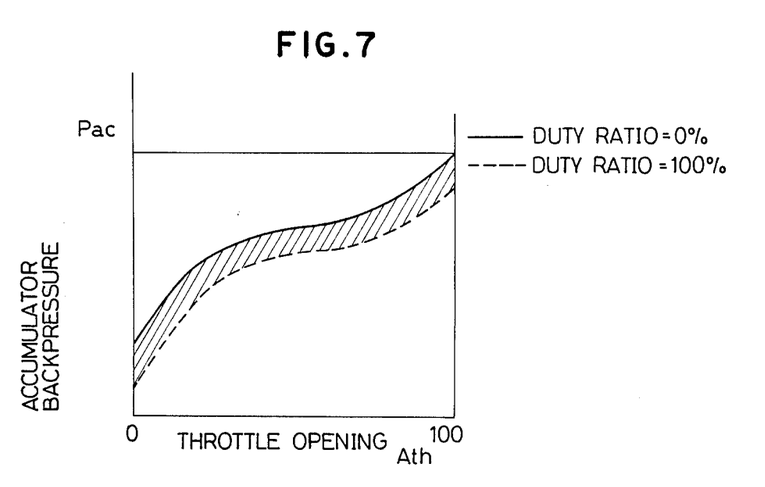
FIG. 7 is a graph showing the relation between the throttle opening of the engine and the backpressure of an accumulator.

The accumulator backpressure control valve 108 receives the throttle pressure Pth, i.e., the torque signal, the solenoid pressure Psl, i.e., transitional shift state signal, and regulates the line pressure PL to an accumulator backpressure Pac according to the pressure Pth and Psl. Pressure balance in the accumulator backpressure control valve 108 is expressed by $$Pac = A1/A2 \cdot Pth + Fs/A2 - Psl \, (A1/A2 - 1) \quad (1)$$

where A1 is the pressure receiving area of a land 170, A2 is the pressure receiving area of a land 172, Fs is the resilient force of a spring 174, and, as obvious from FIG. 4, A1>A2. As obvious from the expression (1), basically, the accumulator backpressure Pac is dependent on the throttle pressure Pth and is corrected by a value corresponding to Psl (A1/A2−1). FIG. 7 shows the relation between the accumulator backpressure Pac and the throttle opening Ath. It is known from FIG. 7 that the accumulator backpressure Pac rises with increasing throttle opening, and that the accumulator backpressure Pac is corrected on the basis of the solenoid pressure Psl, i.e., the duty ratio determined by the ECU 84. If, for any reason, the solenoid valve SD malfunctions, the variation of the accumulator backpressure Pac is limited within a narrow range. Since the solenoid valve SD corrects and regulates the accumulator backpressure Pac minutely, the accuracy of the control of the accumulator backpressure Pac is not affected significantly by an incorrect operation of the solenoid valve SD. Accordingly, the automatic transmission can be controlled accurately without using an especially expensive solenoid valve.

Figure 8:
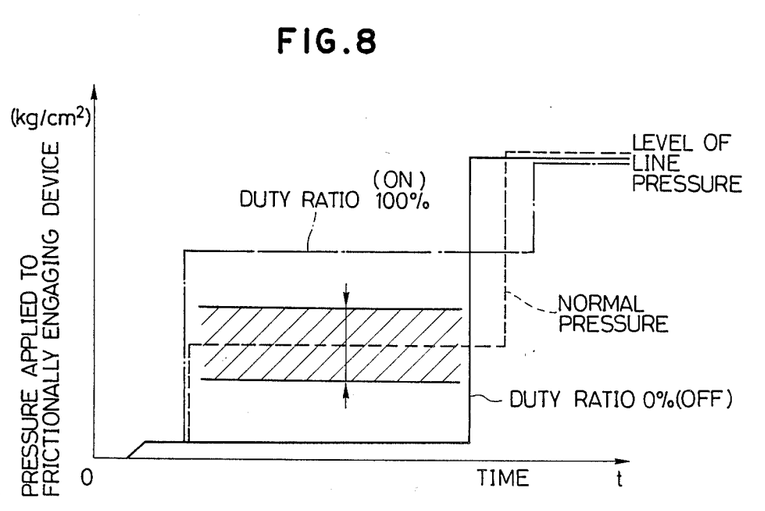
FIG. 8 is a diagram showing the state of variation of the transitional pressure applied to the frictionally engaging devices due to the dispersion of the operation of a solenoid valve.

As shown in FIG. 6, there is a range A in the output pressure Psl of the solenoid valve SD for a specific duty ratio. Accordingly, if the accumulator backpressure Pac is determined by a single solenoid valve system, the actual accumulator backpressure may vary corresponding to a normal accumulator backpressure over a wide range indicated by the shaded area in FIG. 8. However, when the basic characteristics of accumulator backpressure Pac are determined by the throttle pressure and the basic characteristics are corrected according to the actual transitional shift state, as in the present embodiment, the influence of the incorrect operation of the solenoid valve SD on the working pressure is insignificant, and hence the working oil pressure can be controlled more correctly.

Referring again to FIG. 4, when the ECU 84 decides to start shifting operation from 1st to 2nd and the shift valve 114 is controlled by the solenoid valve S1, the line pressure P1 is applied to the brake B2 and the accumulator 112, and then the piston 180 of the accumulator 112 starts moving up. While the piston 180 is moving up, the pressure applied to the brake B2 (transitional oil pressure) is maintained at a pressure corresponding to the downward composite forces of the spring 182 and the pressure generated by the accumulator backpressure Pac applied to the backpressure chamber 113 of the accumulator 112. Accordingly, the transitional oil pressure applied to the brake B2 can be controlled as shown in FIG. 9 by controlling the accumulator backpressure Pac by the foregoing procedure.

Figure 9:
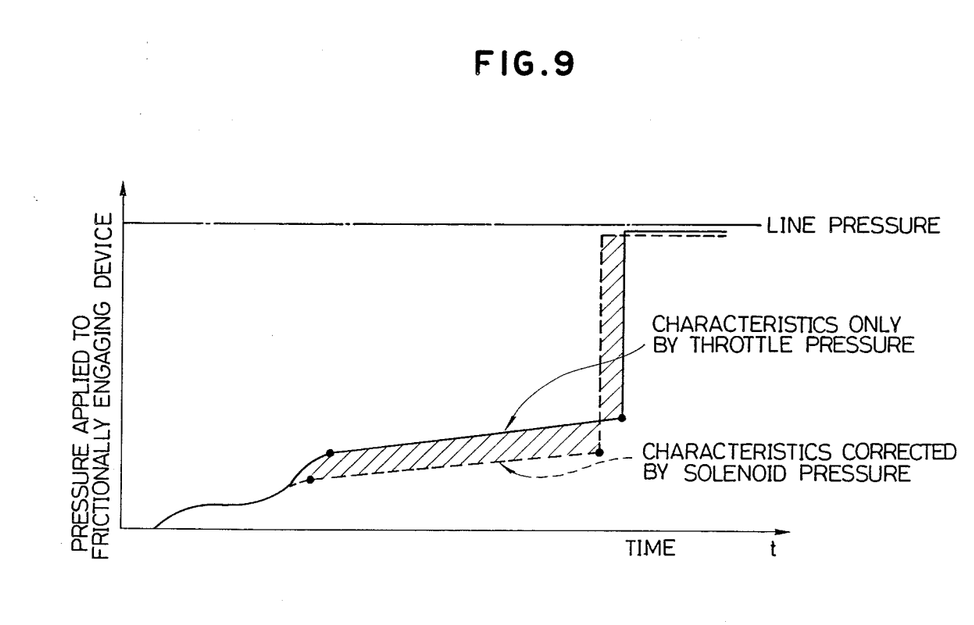
FIG. 9 is a diagram showing the state of increase of the transitional oil pressure.

In FIG. 9, continuous lines indicate the characteristics of the transitional oil pressure controlled only on the basis of the throttle pressure Pth, and broken lines indicate the corrected characteristics of the pressure corrected by using the solenoid pressure Psl. In FIG. 9, the shaded areas represent a correction made by the solenoid pressure Psl indicating the transitional shift state.

Although the foregoing embodiment determines the transitional oil pressure applied to the frictionally engaging devices only on the basis of signals representative of the torque of the engine and the transitional shift state, the present invention is not necessarily limited thereto and other factors may be taken into account for determining the transitional oil pressure to be applied to the frictionally engaging devices.

For example, in a vehicle equipped with a turbocharger, a signal indicating the operation of the turbocharger may be used for determining the transitional oil pressure. Furthermore, the temperature of the engine cooling water or the oil temperature of the automatic transmission may be used additionally for determining the transitional oil pressure. Still further, a signal indicating the position of the shift lever may be used for determining the transitional oil pressure to reduce shocks in shifting the shift lever from the neutral range to the drive range or from the neutral range to the reverse range, by reducing the backpressure of the accumulator.

Although the invention has been described in a preferred form thereof with a certain degree of particularity, many changes and variations are possible therein. It is therefore to be understood that the present invention may be practiced otherwise than specifically described herein without departing from the scope and spirit thereof.

What is claimed is:

1. A hydraulic control system for an automatic transmission, comprising:
    shifting shock reducing means, provided between a shift valve and a frictionally engaging device for changing a gear stage of said automatic transmission, for regulating transitional oil pressure applied to said frictionally engaging device to reduce shifting shock;

torque signal generating means for generating a torque signal representative of engine output torque;

transitional shift state signal generating means for generating a transitional shift state signal representative of a transitional state of shifting operation; and control means for controlling said shifting shock reducing means on the basis of at least said torque signal and said transitional shift state signal.

2. A hydraulic control system as set forth in claim 1, wherein said shifting shock reducing means includes an accumulator having a backpressure chamber, and said control means for controlling the shifting shock reducing means includes an accumulator backpressure control valve for controlling pressure applied to said backpressure chamber of said accumulator.

3. A hydraulic control system as set forth in claim 2, wherein said torque signal includes pressure mechanically generated according to mechanically reflected torque of said engine.

4. A hydraulic control system as set forth in claim 3, further comprising:

a throttle cable which is displaced to a position corresponding to the throttle opening of the engine;

a throttle cam which is rotated corresponding to the displacement of said throttle cable; and a throttle pressure valve for regulating throttle pressure according to the angular rotation of said throttle cam, and said mechanically generated pressure according to the mechanically reflected torque of the engine includes said throttle pressure generated by said throttle pressure valve.

5. A hydraulic control system as set forth in claim 3, wherein said transitional shift state signal is based on pressure generated by an electro-hydraulic transducer according to an electrically detected transitional shift state.

6. A hydraulic control system as set forth in claim 5, further comprising:

detecting means for electrically detecting a variation of at least one of engine speed and rotating speed of the input shaft of said automatic transmission;

reference signal generating means for generating a reference signal representative of the detected variation of at least one of the engine speed and the rotating speed of the input shaft of said automatic transmission; and a solenoid valve which generates a solenoid pressure regulated on the basis of said reference signal, and said pressure generated by said electro-hydraulic transducer includes said solenoid pressure generated by said solenoid valve.

7. A hydraulic control system as set forth in claim 2, wherein said transitional shift state signal is based on pressure generated by an electro-hydraulic transducer according to an electrically detected transitional shift state.

8. A hydraulic control system as set forth in claim 7, further comprising:

detecting means for electrically detecting a variation of at least one of engine speed and rotating speed of the input shaft of said automatic transmission;

reference signal generating means for generating a reference signal representative of the detected variation of at least one of the engine speed and the rotating speed of the input shaft of said automatic transmission; and a solenoid valve which generates a solenoid pressure regulated on the basis of said reference signal, and said pressure generated by said electro-hydraulic transducer includes said solenoid pressure generated by said solenoid valve.

9. A hydraulic control system as set forth in claim 1, wherein said torque signal includes pressure mechanically generated according to mechanically reflected torque of said engine.

10. A hydraulic control system as set forth in claim 9, further comprising:

a throttle cable which is displaced to a position corresponding to the throttle opening of the engine;

a throttle cam which is rotated corresponding to the displacement of said throttle cable; and a throttle pressure valve for regulating throttle pressure according to the angular rotation of said throttle cam, and said mechanically generated pressure according to the mechanically reflected torque of the engine includes said throttle pressure generated by said throttle pressure valve.

11. A hydraulic control system as set forth in claim 9, wherein said transitional shift state signal is based on pressure generated by an electro-hydraulic transducer according to an electrically detected transitional shift state.

12. A hydraulic control system as set forth in claim 11, further comprising:

detecting means for electrically detecting a variation of at least one of engine speed and rotating speed of the input shaft of said automatic transmission;

reference signal generating means for generating a reference signal representative of the detected variation of at least one of the engine speed and the rotating speed of the input shaft of said automatic transmission; and a solenoid valve which generates a solenoid pressure regulated on the basis of said reference signal, and said pressure generated by said electro-hydraulic transducer includes said solenoid pressure generated by said solenoid valve.

13. A hydraulic control system as set forth in claim 1, wherein said transitional shift state signal is based on pressure generated by an electro-hydraulic transducer according to an electrically detected transitional shift state.

14. A hydraulic control system as set forth in claim 13, further comprising:

detecting means for electrically detecting a variation of at least one of engine speed and rotating speed of the input shaft of said automatic transmission;

reference signal generating means for generating a reference signal representative of the detected variation of at least one of the engine speed and the rotating speed of the input shaft of said automatic transmission; and a solenoid valve which generates a solenoid pressure regulated on the basis of said reference signal, and said pressure generated by said electro-hydraulic transducer includes said solenoid pressure generated by said solenoid valve.

* * * * *